(12) United States Patent
Wang et al.

(10) Patent No.: US 12,007,624 B2
(45) Date of Patent: Jun. 11, 2024

(54) OPTICAL LENS ASSEMBLY

(71) Applicant: NINGBO SUNNY AUTOMOTIVE OPTECH CO., LTD, Ningbo (CN)

(72) Inventors: Dongfang Wang, Ningbo (CN); Bo Yao, Ningbo (CN); Bao Zhou, Ningbo (CN)

(73) Assignee: NINGBO SUNNY AUTOMOTIVE OPTECH CO., LTD, Ningbo (CN)

(*) Notice: Subject to any disclaimer, the term of this patent is extended or adjusted under 35 U.S.C. 154(b) by 865 days.

(21) Appl. No.: 17/081,191

(22) Filed: Oct. 27, 2020

(65) Prior Publication Data

US 2021/0041664 A1 Feb. 11, 2021

Related U.S. Application Data

(63) Continuation of application No. PCT/CN2019/079981, filed on Mar. 28, 2019.

(30) Foreign Application Priority Data

Apr. 28, 2018 (CN) .......................... 201810400442.3
Oct. 25, 2018 (CN) .......................... 201811249721.0

(51) Int. Cl.
*G02B 9/62* (2006.01)
*G02B 13/18* (2006.01)

(52) U.S. Cl.
CPC .............. *G02B 9/62* (2013.01); *G02B 13/18* (2013.01)

(58) Field of Classification Search
CPC ................ G02B 15/145529; G02B 15/145515
See application file for complete search history.

(56) References Cited

U.S. PATENT DOCUMENTS 3,944,337 A * 3/1976 Ruben ...................... G02B 9/14
359/716
2012/0170142 A1 7/2012 Hsieh et al.
2016/0124192 A1 5/2016 Koreeda
(Continued)

FOREIGN PATENT DOCUMENTS

| CN | 101285928 A | 10/2008 | |
|---|---|---|---|
| CN | 201955535 U * | 8/2011 | ......... G02B 13/0045 |
| CN | 201955535 U | 8/2011 | |

(Continued)

OTHER PUBLICATIONS

International Search Report issued in corresponding International Application No. PCT/CN2019/079981, mailed Jul. 3, 2019; State Intellectual Property Office of the P.R. China, Beijing, China, 8 pgs.

*Primary Examiner* — Marin Pichler
*Assistant Examiner* — Mackenzi Waddell
(74) *Attorney, Agent, or Firm* — HAUPTMAN HAM, LLP

(57) ABSTRACT

The present disclosure discloses an optical lens assembly including, sequentially from an object side to an image side along an optical axis, a first lens, a second lens, a third lens, a fourth lens, a fifth lens and a sixth lens. An object-side surface of the first lens is convex, and an image-side surface thereof is concave. The second lens has negative refractive power. The third lens has positive refractive power. The fourth lens has positive refractive power, and both an object-side surface and an image-side surface thereof are convex. The fifth lens has positive refractive power. The sixth lens has negative refractive power.

20 Claims, 3 Drawing Sheets

(56) References Cited

U.S. PATENT DOCUMENTS

2017/0184815 A1* 6/2017 Wang ...................... G02B 5/005
2018/0059362 A1* 3/2018 Yeh ........................ G02B 1/041

FOREIGN PATENT DOCUMENTS

| | | | | |
|---|---|---|---|---|
| CN | 103676104 A | * | 3/2014 | ......... G02B 13/0045 |
| CN | 103676104 A | | 3/2014 | |
| CN | 105319688 A | | 2/2016 | |
| CN | 105892037 A | | 8/2016 | |
| CN | 106814439 A | | 6/2017 | |
| CN | 106997086 A | | 8/2017 | |
| CN | 107203031 A | | 9/2017 | |
| CN | 207020385 U | | 2/2018 | |
| CN | 107783252 A | | 3/2018 | |
| TW | 201643494 A | | 12/2016 | |

* cited by examiner

OPTICAL LENS ASSEMBLY

CROSS-REFERENCE TO RELATED APPLICATIONS

The present patent application is a continuation of International Application No. PCT/CN2019/079981, filed on Mar. 28, 2019, which claims priorities to Chinese Patent Application No. 201810400442.3, entitled "Optical Lens Assembly", filed before the China National Intellectual Property Administration on Apr. 28, 2018, and Chinese Patent Application No. 201811249721.0, entitled "Optical Lens Assembly", filed before the China National Intellectual Property Administration on Oct. 25, 2018. All of the aforementioned patent applications are hereby incorporated by reference in their entireties.

TECHNICAL FIELD

The present disclosure relates to an optical lens assembly, and more specifically, relates to an optical lens assembly including six lenses.

BACKGROUND

With the development of science, more and more fields, such as automotive, surveillance, projection, and industrial fields, need to use camera lenses as "eyes". With the growth of demand and the development of technology, the performance requirements of camera lenses are also getting higher and higher, especially the pixel requirements of camera lenses. Especially in recent years, the market for advanced driver assistance systems (ADAS) has developed rapidly. As an important part of ADAS, the performance requirements of on-board lenses are increasing day by day, and mainly reflected in the following aspects:

1. The requirements for the resolution of on-board lenses are getting higher and higher. Especially for the front-view lens, the resolution has been continuously improved from the original megapixel towards 2M, and even pursued higher resolution of 4M and 8M.

2. As the resolution increases, the size of the chip increases, resulting in an increase in the size of the lens. However, for some lenses used in limited installation positions, miniaturization of the lens is particularly important. For example, for an on-board front-view lens that needs to be installed inside the windshield, an excessively large lens size will interfere with the perspective effect of the windshield. The total length of the existing lens is about 45 mm, which is not advantageous in terms of miniaturization. Therefore, a special lens design is needed to realize the small size of the lens.

3. As the pixels of the lens become higher and higher, the size of the chip also increases, and the number of lenses gradually increases, resulting in an increase in the size of the entire lens and higher costs.

4. In special application environments such as vehicles driving at night, due to insufficient external light, it is necessary to increase the amount of light entering by increasing the aperture of the lens to improve the night vision effect of the vehicle lens. However, this will also increase the aperture of the lens.

SUMMARY

The present disclosure provides an optical lens assembly that is applicable to on-board installation and at least overcomes or partially overcomes at least one of the above deficiencies of the prior art.

In the first aspect, the present disclosure provides an optical lens assembly, which may include, sequentially from an object side to an image side along an optical axis, a first lens, a second lens, a third lens, a fourth lens, a fifth lens and a sixth lens. The first lens may have positive refractive power, an object-side surface thereof may be a convex surface, and an image-side surface thereof may be a concave surface. The second lens and the third lens are cemented to form a first cemented lens. The fourth lens may have positive refractive power, and both an object-side surface and an image-side surface thereof may be convex surfaces. The fifth lens and the sixth lens are cemented to form a second cemented lens.

In one embodiment, the second lens in the first cemented lens may have negative refractive power, and both an object-side surface and an image-side surface thereof may be concave surfaces. The third lens in the first cemented lens may have positive refractive power, and both an object-side surface and an image-side surface thereof may be convex surfaces.

In one embodiment, the fifth lens in the second cemented lens may have positive refractive power, an object-side surface thereof may be a convex surface, and an image-side surface thereof may be a concave surface. The sixth lens in the second cemented lens may have negative refractive power, an object-side surface thereof may be a convex surface, and an image-side surface thereof may be a concave surface.

In one embodiment, the first lens may be an aspheric lens. Optionally, the first lens may be an aspheric lens made of glass.

In one embodiment, the fourth lens may be an aspheric lens.

In one embodiment, a radius of curvature R1 of an object-side surface of the first lens, a radius of curvature R2 of an image-side surface of the first lens and a center thickness d1 of the first lens along the optical axis may satisfy $0.6 \le R1/(R2+d1) \le 1.1$.

In one embodiment, a maximum field-of-view FOV of the optical lens assembly, a maximum effective aperture diameter D of an object-side surface of the first lens corresponding to the maximum field-of-view of the optical lens assembly, and an image height H corresponding to the maximum field-of-view of the optical lens assembly may satisfy $D/H/FOV \le 0.08$.

In one embodiment, a total track length TTL of the optical lens assembly and a total focal length F of the optical lens assembly may satisfy $TTL/F \le 3$.

In one embodiment, the optical lens assembly may further include a stop, and the stop may be disposed between the object side and the second lens. Optionally, the stop may be disposed between the object side and the first lens. Optionally, the stop may be disposed between the first lens and the second lens.

In the second aspect, the present disclosure provides an optical lens assembly, which may include, sequentially from an object side to an image side along an optical axis, a first lens, a second lens, a third lens, a fourth lens, a fifth lens and a sixth lens. The first lens may have positive refractive power, an object-side surface thereof may be a convex surface, and an image-side surface thereof may be a concave surface. The second lens may have negative refractive power, and both an object-side surface and an image-side surface thereof may be concave surfaces. The third lens may have positive refractive power, and both an object-side surface and an image-side surface thereof may be convex surfaces. The fourth lens may have positive refractive power, and both an object-side surface and an image-side surface thereof may be convex surfaces. The fifth lens may have positive refractive power, an object-side surface thereof may be a convex surface, and an image-side surface thereof may be a concave surface. The sixth lens may have negative refractive power, an object-side surface thereof may be a convex surface, and an image-side surface thereof may be a concave surface. A total track length TTL of the optical lens assembly and a total focal length F of the optical lens assembly may satisfy TTL/F≤3.

In one embodiment, the second lens and the third lens may be cemented to form a first cemented lens.

In one embodiment, the fifth lens and the sixth lens may be cemented to form a second cemented lens.

In one embodiment, the first lens may be an aspheric lens. Optionally, the first lens may be an aspheric lens made of glass.

In one embodiment, the fourth lens may be an aspheric lens.

In one embodiment, a radius of curvature R1 of an object-side surface of the first lens, a radius of curvature R2 of an image-side surface of the first lens and a center thickness d1 of the first lens along the optical axis may satisfy 0.6≤R1/(R2+d1)≤1.1.

In one embodiment, a maximum field-of-view FOV of the optical lens assembly, a maximum effective aperture diameter D of an object-side surface of the first lens corresponding to the maximum field-of-view of the optical lens assembly, and an image height H corresponding to the maximum field-of-view of the optical lens assembly may satisfy D/H/FOV≤0.08.

In one embodiment, the optical lens assembly may further include a stop, and the stop may be disposed between the object side and the second lens. Optionally, the stop may be disposed between the object side and the first lens. Optionally, the stop may be disposed between the first lens and the second lens.

In the third aspect, the present disclosure provides an optical lens assembly, which may include, sequentially from an object side to an image side along an optical axis, a first lens, a second lens, a third lens, a fourth lens, a fifth lens and a sixth lens. The first lens may have negative refractive power, an object-side surface thereof is a convex surface, and an image-side surface thereof is a concave surface. The second lens may have negative refractive power, and both an object-side surface and an image-side surface thereof are concave surfaces. The third lens may have positive refractive power, and both an object-side surface and an image-side surface thereof are convex surfaces. The fourth lens may have positive refractive power. The fifth lens may have positive refractive power, an object-side surface thereof is a convex surface, and an image-side surface thereof is a concave surface. The sixth lens may have negative refractive power, an object-side surface thereof is a convex surface, and an image-side surface thereof is a concave surface.

In one embodiment, both an object-side surface and an image-side surface of the fourth lens may be convex surfaces.

In one embodiment, both the first lens and the fourth lens may be aspherical lenses.

In one embodiment, the optical lens assembly may further include a stop disposed between the first lens and the second lens.

In one embodiment, the second lens and the third lens may be cemented with each other to form a first cemented lens.

In one embodiment, the fifth lens and the sixth lens may be cemented with each other to form a second cemented lens.

In one embodiment, an optical back focal length BFL of the optical lens assembly and a lens group length TL of the optical lens assembly may satisfy BFL/TL≥0.20.

In one embodiment, a total track length TTL of the optical lens assembly and a total focal length F of the optical lens assembly may satisfy TTL/F≤3.5.

In one embodiment, a maximum field-of-view FOV of the optical lens assembly, a maximum effective aperture diameter D of the object-side surface of the first lens corresponding to the maximum field-of-view of the optical lens assembly, and an image height H corresponding to the maximum field-of-view of the optical lens assembly may satisfy D/H/FOV≤0.07.

In one embodiment, a focal length F3 of the third lens and a focal length F2 of the second lens may satisfy |F3/F2|≤1.25.

In one embodiment, a combined focal length F23 of the second lens and the third lens and a total focal length F of the optical lens assembly may satisfy 4≤F23/F≤7.

In the fourth aspect, the present disclosure provides an optical lens assembly, which may include, sequentially from an object side to an image side along an optical axis, a first lens, a second lens, a third lens, a fourth lens, a fifth lens and a sixth lens. Each of the first lens, the second lens and the sixth lens may have negative refractive power. Each of the third lens, the fourth lens and the fifth lens may have positive refractive power. The second lens and the third lens may be cemented with each other to form a first cemented lens. The fifth lens and the sixth lens may be cemented with each other to form a second cemented lens. A total track length TTL of the optical lens assembly and a total focal length F of the optical lens assembly may satisfy TTL/F≤3.5.

In one embodiment, an object-side surface of the first lens is a convex surface, and an image-side surface thereof is a concave surface.

In one embodiment, both an object-side surface and an image-side surface of the second lens are concave surfaces.

In one embodiment, both an object-side surface and an image-side surface of the third lens are convex surfaces.

In one embodiment, both an object-side surface and an image-side surface of the fourth lens may be convex surfaces.

In one embodiment, an object-side surface of the fifth lens is a convex surface, and an image-side surface thereof is a concave surface.

In one embodiment, an object-side surface of the sixth lens is a convex surface, and an image-side surface thereof is a concave surface.

In one embodiment, both the first lens and the fourth lens may be aspherical lenses.

In one embodiment, the optical lens assembly may further include a stop disposed between the first lens and the second lens.

In one embodiment, an optical back focal length BFL of the optical lens assembly and a lens group length TL of the optical lens assembly may satisfy BFL/TL≥0.20.

In one embodiment, a maximum field-of-view FOV of the optical lens assembly, a maximum effective aperture diameter D of the object-side surface of the first lens corresponding to the maximum field-of-view of the optical lens assembly, and an image height H corresponding to the maximum field-of-view of the optical lens assembly may satisfy D/H/FOV≤0.07.

In one embodiment, a focal length F3 of the third lens and a focal length F2 of the second lens may satisfy |F3/F2|≤1.25.

In one embodiment, a combined focal length F23 of the second lens and the third lens and the total focal length F of the optical lens assembly may satisfy 4≤F23/F≤7.

Some embodiments of the present disclosure include, for example, six lenses. By optimizing the shape of the lens, reasonably distributing the refractive power of each lens, and cementing to form a cemented lens, the optical lens assembly has at least one of the beneficial effects of miniaturization, large aperture, and high pixels. In addition, the above-mentioned embodiments or some other embodiments of the present disclosure may also achieve at least one of the beneficial effects of miniaturization, small aperture, high resolution, low cost, and long back focal length.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

Figure 1:
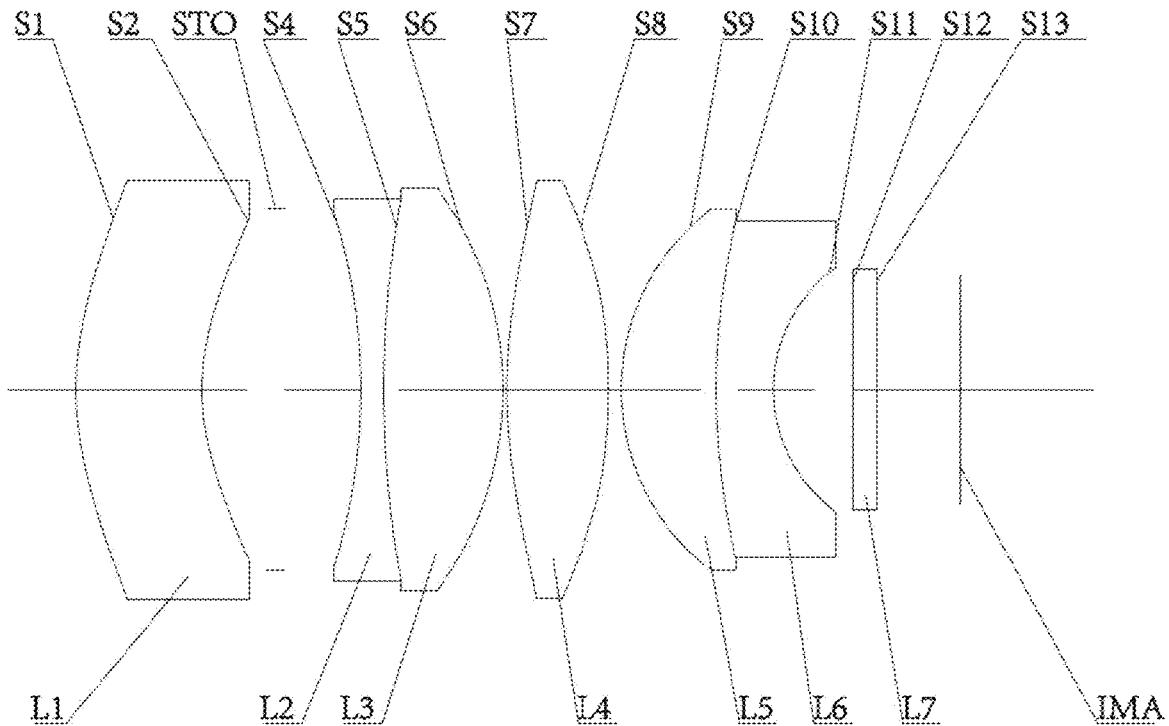
FIG. 1 is a schematic structural diagram showing an optical lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, without departing from the teachings of the present disclosure, a first lens discussed below may also be referred to as a second lens or a third lens, and a first cemented lens may also be referred to as a second cemented lens.

In the accompanying drawings, the thickness, size and shape of the lens have been somewhat exaggerated for the convenience of explanation. In particular, shapes of spherical surfaces or aspherical surfaces shown in the accompanying drawings are shown by way of example. That is, shapes of the spherical surfaces or the aspherical surfaces are not limited to the shapes of the spherical surfaces or the aspherical surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to exemplary embodiments of the present disclosure includes, for example, six lenses having refractive power, i.e., a first lens, a second lens, a third lens, a fourth lens, a fifth lens and a sixth lens. The six lenses are sequentially arranged from an object side to an image side along an optical axis.

An optical lens assembly according to exemplary embodiments of the present disclosure may further include a photosensitive element disposed on an imaging plane. Optionally, the photosensitive element disposed on the imaging plane may be a Charge-Coupled Device element (CCD) or a Complementary Metal-Oxide Semiconductor element (CMOS).

In an aspect, according to some embodiments of the present disclosure, the first lens may have positive refractive power, an object-side surface thereof may be a convex surface, and an image-side surface thereof may be a concave surface. The first lens is configured as a meniscus lens convex towards the object side and has a shape similar to a concentric circle, which is conducive to collecting as much light as possible from a large field of view, allowing more light to enter the rear optical system, and increasing the amount of light. In some embodiments, the first lens may be an aspheric glass lens to improve the resolution and to avoid the limitation of the processing and manufacturing of the spherical concentric lens. In practical applications, considering that the outdoor installation and use environment of the on-board lens may be harsh, configuring the object-side surface of the first lens as a convex surface also facilitates the sliding of water droplets, thereby reducing the impact of bad weather such as rain or snow on the imaging quality of the lens assembly.

In an exemplary embodiment, a radius of curvature R1 of the object-side surface of the first lens, a radius of curvature R2 of the image-side surface of the first lens and a center thickness d1 of the first lens along the optical axis may satisfy conditional expression $0.6 \leq R1/(R2+d1) \leq 1.1$. R1, R2 and d1 may further satisfy $0.75 \leq R1/(R2+d1) \leq 1.05$, for example, $0.84 \leq R1/(R2+d1) \leq 0.93$.

The second lens may have negative refractive power, and both an object-side surface and an image-side surface thereof may be concave surfaces.

The third lens may have positive refractive power, and both an object-side surface and an image-side surface thereof may be convex surfaces.

The fourth lens may have positive refractive power, and both an object-side surface and an image-side surface thereof may be convex surfaces. Arranging the fourth lens as a biconvex lens facilitates the smooth transition of light from the front end to the rear optical system. As is known to those skilled in the art, aspheric lenses have better radius of curvature characteristics and have the advantages of reducing distortion and astigmatic aberration, which can improve imaging quality. In practice, at least one of the object-side surface and the image-side surface of the fourth lens may be arranged as an aspheric surface to further improve the resolution quality of the lens assembly.

The fifth lens may have positive refractive power, an object-side surface thereof may be a convex surface, and an image-side surface thereof may be a concave surface.

The sixth lens may have negative refractive power, an object-side surface thereof may be a convex surface, and an image-side surface thereof may be a concave surface.

As is known to those skilled in the art, the non-cemented lens at the turning point of the light is prone to be sensitive due to processing errors and/or assembly errors, and the use of a cemented lens may effectively reduce the sensitivity of the system. Using a cemented lens may not only effectively reduce the sensitivity of the system, shorten the overall length of the system, but also correct the overall chromatic aberration and aberration of the system, and improve the resolution of the optical lens assembly. In addition, the use of cemented lenses may also simplify the assembly of the system, and may effectively reduce the tolerance sensitivity issues, such as tilt or eccentricity, of the lens unit during the assembly process.

In an exemplary embodiment, the second lens and the third lens may be combined into a first cemented lens by cementing an image-side surface of the second lens with an object-side surface of the third lens. The first cemented lens may include a lens made of a material with high refractive index and low Abbe number and a lens made of a material with low refractive index and high Abbe number (compared to the material with high refractive index and low Abbe number). Specifically, in exemplary embodiments, the refractive index of the second lens is higher than the refractive index of the third lens, and the Abbe number of the second lens is lower than the Abbe number of the third lens. The combination of a lens with a high refractive index and a lens with a low refractive index is conducive to the rapid transition of light from the front, and is beneficial to increase the aperture of the stop, so that the lens may meet the requirements of night vision. In addition, the combination of a lens with a high refractive index and a lens with a low refractive index also helps to eliminate the chromatic aberration of the cemented lens, reduce tolerance sensitivity, and generate partial residual chromatic aberration to compensate the chromatic aberration of the system. Also, the air gap is reduced by cementing, which is beneficial to shorten the total length of the system.

In an exemplary embodiment, the fifth lens and the sixth lens may be combined into a second cemented lens by cementing an image-side surface of the fifth lens with an object-side surface of the sixth lens. The second cemented lens may be cemented with a lens having positive refractive power in the front and a lens having negative refractive power in the rear. Such cementing is beneficial to smoothly transition the light passing through the fourth lens to the sixth lens, shorten the total length of the optical system, and may reduce the diameter of the rear end or the size of the rear end of the lens. In addition, the use of cemented lenses is also beneficial to eliminate its own chromatic aberration, reduce tolerance sensitivity, and generate partial residual chromatic aberration to compensate the chromatic aberration of the system.

In an exemplary embodiment, a stop for limiting the light beam may be disposed between, for example, the object side and the second lens to further improve the imaging quality of the lens assembly. When the stop is arranged between the first lens and the second lens, the diameter of the front end and the size of the front end of the lens assembly may be effectively reduced, and a large aperture may be realized. Furthermore, the stop may be arranged between the object side and the first lens. This arrangement is more conducive to reducing the aperture of the front end of the lens assembly. It should be understood that the position of the stop is not limited to the above-mentioned position, and may be disposed at any other position as required.

In an exemplary embodiment, a total track length TTL of the optical lens assembly (i.e., a distance along the optical axis from a center of the object-side surface of the first lens to the imaging plane IMA of the optical lens assembly) and a total focal length F of the optical lens assembly may satisfy $TTL/F \leq 3$. More specifically, TTL and F may further satisfy $TTL/F \leq 2.5$, for example, $2.12 \leq TTL/F \leq 2.25$. Satisfying the conditional expression $TTL/F \leq 3$ can reflect the miniaturization characteristics of the lens assembly.

In an exemplary embodiment, a maximum field-of-view FOV of the optical lens assembly, a maximum effective aperture diameter D of an object-side surface of the first lens corresponding to the maximum field-of-view of the optical lens assembly, and an image height H corresponding to the maximum field-of-view of the optical lens assembly satisfy $D/H/FOV \leq 0.08$. More specifically, D, H and FOV may further satisfy $D/H/FOV \leq 0.07$, for example, $0.05 \leq D/H/FOV \leq 0.06$. Satisfying the conditional expression $D/H/FOV \leq 0.08$ can reflect the small aperture of the front end of the lens assembly.

The optical lens assembly according to the above-mentioned embodiment of the present disclosure can achieve high resolution (up to 8M pixels) by reasonable setting the shape and material of lenses. Reasonably configuring the shape and refractive power of lenses will help reduce the total optical length of the lens and realize the miniaturization of the lens. The use of the two sets of cemented lenses can compact the overall structure of the optical system while facilitating lens assembly, reducing tolerance sensitivity, and effectively reducing the chromatic aberration of the system. In addition, the optical lens assembly has the performance of a large aperture, which may effectively increase the amount of incident light and improve the brightness on the imaging plane. The optical lens assembly has a better night vision effect, which may meet the needs of the on-board lens at night or other special scenes with insufficient light. The optical lens assembly has the characteristics of miniaturization, large aperture, high pixels, etc., which may better meet the requirements of on-board lens applications in specific scenarios.

In another aspect, according to some embodiments of the present disclosure, the first lens may have negative refractive power, an object-side surface thereof may be a convex surface, and an image-side surface thereof may be a concave surface. The first lens is configured as a meniscus lens convex towards the object side to collect as much light as possible from a large field of view to enter the rear optical system, which is beneficial to reduce the diameter of the front end and increase the amount of light entering.

The second lens may have negative refractive power, and both an object-side surface and an image-side surface thereof may be concave surfaces.

The third lens may have positive refractive power, and both an object-side surface and an image-side surface thereof may be convex surfaces.

The fourth lens may have positive refractive power, and both an object-side surface and an image-side surface thereof may be convex surfaces. The fourth lens is configured as a biconvex lens, which is conducive to condensing light, reducing the aperture, and transiting the light smoothly.

The fifth lens may have positive refractive power, an object-side surface thereof may be a convex surface, and an image-side surface thereof may be a concave surface.

The sixth lens may have negative refractive power, an object-side surface thereof may be a convex surface, and an image-side surface thereof may be a concave surface.

In an exemplary embodiment, a stop for limiting the light beam may be disposed between, for example, the first lens and the second lens to further improve the imaging quality of the lens assembly. When the stop is arranged between the first lens and the second lens, the light entering the optical system can be effectively concentrated, thereby reducing the aperture of the lens of the optical system. However, it should be noted that the position of the stop disclosed herein is only exemplary and not restrictive. In an alternative embodiment, the stop may also be disposed at other position as required.

In an exemplary embodiment, the optical lens assembly according to the present disclosure may further include a filter disposed between the sixth lens and the imaging plane to filter light having different wavelengths, as required. In addition, the optical lens assembly may also include a protective glass disposed between the filter and the imaging plane to prevent internal components (for example, chips) of the optical lens assembly from being damaged.

As is known to those skilled in the art, cemented lenses can be used to minimize or eliminate chromatic aberration. The use of cemented lenses in the optical lens assembly may improve image quality and reduce the reflection loss of light energy, thereby enhancing the imaging sharpness of the lens assembly. In addition, the use of cemented lenses may also simplify the assembly procedures in the lens manufacturing process.

In an exemplary embodiment, the second lens and the third lens may be combined into a first cemented lens by cementing an image-side surface of the second lens with an object-side surface of the third lens. The first cemented lens consists of a negative lens (that is, the second lens) and a positive lens (that is, the third lens). The combination of high and low refractive index of the positive and negative lenses is conducive to the rapid transition of light from the front end. In addition, the use of the first cemented lens effectively reduces the chromatic aberration of the system, and makes the overall structure of the optical system compact to satisfy the requirements of miniaturization. At the same time, the use of the first cemented lens reduces the sensitivity of the individual lens.

In the first cemented lens, the second lens near the object side has negative refractive power, and the third lens near the image side has positive refractive power. By arranging the lens with negative refractive power in the front and the lens with positive refractive power in the rear, the light from the front may be converged to the rear optical system after divergence, which is more conducive to reducing the optical path of the light in the rear optical system, thereby realizing a short TTL.

In an exemplary embodiment, the fifth lens and the sixth lens may be combined into a second cemented lens by cementing an image-side surface of the fifth lens with an object-side surface of the sixth lens. The second cemented lens may eliminate its own chromatic aberration, reduce tolerance sensitivity, and may also generate partial residual chromatic aberration to compensate the chromatic aberration of the system. In the second cemented lens, the fifth lens close to the object side may condense the light and further converge and adjust the light, thereby reducing the diameter of the rear end. The sixth lens close to the image side may diverge light, which is beneficial to enlarge the imaging plane.

In an exemplary embodiment, an optical back focal length BFL of the optical lens assembly and a lens group length TL of the optical lens assembly may satisfy BFL/TL≥0.20. More desirable, BFL/TL≥0.22 may be further satisfied. By satisfying the conditional expression BFL/TL≥0.20, the characteristics of long back focal length may be satisfied on the basis of miniaturization, which is beneficial to the assembly of the optical lens assembly.

In an exemplary embodiment, a total track length TTL of the optical lens assembly and a total focal length F of the optical lens assembly may satisfy TTL/F≤3.5. More desirable, TTL/F≤3 may be further satisfied. Satisfying the conditional expression TTL/F≤3.5 may ensure the miniaturization of the system.

In an exemplary embodiment, a maximum field-of-view FOV of the optical lens assembly, a maximum effective aperture diameter D of the object-side surface of the first lens corresponding to the maximum field-of-view of the optical lens assembly, and an image height H corresponding to the maximum field-of-view of the optical lens assembly may satisfy D/H/FOV≤0.07. More desirable, D/H/FOV≤0.065 may be further satisfied. Satisfying the conditional expression D/H/FOV≤0.07 may realize the small aperture characteristic of the front end of the lens.

In an exemplary embodiment, a focal length F3 of the third lens and a focal length F2 of the second lens may satisfy |F3/F2|≤1.25. More desirable, |F3/F2|≤1.1 may be further satisfied. Setting the focal lengths of the adjacent second lens and the third lens to be relatively close may help the light transition smoothly.

In an exemplary embodiment, a combined focal length F23 of the second lens and the third lens and the total focal length F of the optical lens assembly may satisfy 4≤F23/F≤7. More desirable, 4.3≤F23/F≤6.8 may be further satisfied. By controlling the light trend between the first lens and the fourth lens, the aberrations caused by the large-angle light entering through the first lens may be reduced, and the lens structure may be made compact, thereby facilitating the realization of miniaturization characteristics.

In an exemplary embodiment, the first lens and the fourth lens in the optical lens assembly according to the present disclosure may be aspherical lenses. Aspheric lenses are characterized by a continuous change in curvature from the center of the lens to the periphery. Unlike spherical lenses, which have a constant curvature from the center of the lens to the periphery, aspheric lenses have better radius of curvature characteristics and have the advantages of improving distortion and astigmatic aberration. With the aspheric lens, aberrations occurring during imaging can be eliminated as much as possible, thereby improving the imaging quality of the lens. For example, the first lens may be an aspheric lens to improve resolution and correct chromatic aberration. The fourth lens may be an aspheric lens to improve resolution, reduce distortion, and correct aberrations such as coma and curvature of field. It should be understood that, in order to improve the imaging quality, the number of aspheric lenses in the optical lens assembly according to the present disclosure may be increased.

In an exemplary embodiment, the lens used in the optical lens assembly may be a plastic lens or a glass lens. The plastic lens has a large thermal expansion coefficient. When the environment temperature of the lens changes greatly, the plastic lens will cause a greater change in the optical back focal length. The use of glass lenses can reduce the effect of temperature on the optical back focal length of the lens, but the cost is higher.

By reasonable configuring the shape and the refractive power of the lens, the optical lens assembly according to the above-mentioned embodiments of the present disclosure realizes low cost and high resolution with only 6 lenses. In addition, by controlling the shape of the first lens, the optical lens assembly according to the above-mentioned embodiments of the present disclosure may achieve a small aperture of the lens assembly while meeting the requirements of the clear aperture. At the same time, by placing the stop between the first lens and the second lens, the aperture of the front end of the lens is further reduced. The optical lens assembly according to the above-mentioned embodiments of the present disclosure may ensure resolution clarity, and may provide the driver with accurate information to reduce the risk of software misjudgment. Therefore, the optical lens assembly according to the above-mentioned embodiments of the present disclosure may have at least one of the beneficial effects of miniaturization, small aperture, high resolution, low cost, large aperture, and long back focal length, so as to better meet the requirements of on-board lenses.

Those skilled in the art should understand that the total track length TTL of the optical lens assembly mentioned above refers to a distance along the optical axis from a center of an object-side surface of the first lens to an imaging plane. The optical back focal length BFL of the optical lens assembly refers to a distance along the optical axis from a center of an image-side surface of the sixth lens, the last lens, to the imaging plane. The lens group length TL of the optical lens assembly refers to a distance along the optical axis from the center of the object-side surface of the first lens to the center of the image-side surface of the sixth lens.

However, it will be understood by those skilled in the art that the number of lenses constituting the optical lens assembly may be varied to achieve the various results and advantages described in this specification without departing from the technical solution claimed by the present disclosure. For example, although some embodiments are described by taking six lenses as an example, the optical lens assembly is not limited to include six lenses. The optical lens assembly may also include other numbers of lenses if desired.

Some specific examples of an optical lens assembly applicable to the above embodiment will be further described below with reference to the accompanying drawings.

Example 1

An optical lens assembly according to Example 1 of the present disclosure is described below with reference to FIG. 1. FIG. 1 shows a schematic structural diagram of the optical lens assembly according to Example 1 of the present disclosure.

As shown in FIG. 1, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having positive refractive power, and an object-side surface S1 thereof is a convex surface and an image-side surface S2 thereof is a concave surface. Both the object-side surface S1 and the image-side surface S2 of the first lens L1 are aspherical. The second lens L2 is a biconcave lens having negative refractive power, and both an object-side surface S4 and an image-side surface S5 thereof are concave surfaces. Both the object-side surface S4 and the image-side surface S5 of the second lens L2 are spherical. The third lens L3 is a biconvex lens having positive refractive power, and both an object-side surface S5 and an image-side surface S6 thereof are convex surfaces. Both the object-side surface S5 and the image-side surface S6 of the third lens L3 are spherical. The fourth lens L4 is a biconvex lens having positive refractive power, and both an object-side surface S7 and an image-side surface S8 thereof are convex surfaces. Both the object-side surface S7 and the image-side surface S8 of the fourth lens L4 are aspherical. The fifth lens L5 is a meniscus lens having positive refractive power, and an object-side surface S9 thereof is a convex surface and an image-side surface S10 thereof is a concave surface. Both the object-side surface S9 and the image-side surface S10 of the fifth lens L5 are spherical. The sixth lens L6 is a meniscus lens having negative refractive power, and an object-side surface S10 thereof is a convex surface and an image-side surface S11 thereof is a concave surface. Both the object-side surface S10 and the image-side surface S11 of the sixth lens L6 are spherical.

In this example, the second lens L2 and the third lens L3 are cemented together to form a first cemented lens. The fifth lens L5 and the sixth lens L6 are cemented together to form a second cemented lens.

Optionally, the optical lens assembly may further include an optical filter and/or a protective lens L7 having an object-side surface S12 and an image-side surface S13. The optical filter may be used to correct color deviations. The protective lens may be used to protect an image sensing chip located on an imaging plane IMA. Light from an object sequentially passes through the respective surfaces S1 to S13 and is finally imaged on the imaging plane IMA.

In the optical lens assembly of the present example, a stop STO may be disposed between the first lens L1 and the second lens L2 to improve imaging quality.

Table 1 shows radius of curvature R, thickness T, refractive index Nd and Abbe number Vd of each lens of the optical lens assembly in Example 1, wherein the units for the radius of curvature R and the thickness T are millimeter (mm).

TABLE 1

| Surface No. | Radius of Curvature R | Thickness T | Refractive Index Nd | Abbe Number Vd |
|---|---|---|---|---|
| S1 | 15.4959 | 4.9860 | 1.81 | 32.00 |
| S2 | 13.3889 | 2.8819 | | |
| STO | Infinite | 3.3938 | | |
| S4 | −23.8787 | 0.9000 | 1.85 | 32.30 |
| S5 | 42.0103 | 4.7316 | 1.62 | 54.00 |
| S6 | −13.5653 | 0.1500 | | |
| S7 | 23.1403 | 4.0529 | 1.59 | 61.20 |
| S8 | −21.6504 | 0.1500 | | |
| S9 | 9.0342 | 3.7397 | 1.50 | 65.00 |
| S10 | 28.6906 | 2.2803 | 1.64 | 35.70 |
| S11 | 5.9845 | 3.5000 | | |
| S12 | Infinite | 0.9500 | 1.52 | 64.17 |
| S13 | Infinite | 3.4969 | | |
| IMA | Infinite | | | |

The example employs six lenses as an example. By properly configuring the refractive power and surface shape of each lens, the center thickness of each lens, and the air gap between the lenses, one of the beneficial effects of miniaturization, large aperture, and high pixels may be achieved. The surface shape Z of each aspherical is defined by the following formula:

$$Z(h) = \frac{ch^2}{1 + \sqrt{1 - (k+1)c^2h^2}} + Ah^4 + Bh^6 + Ch^8 + Dh^{10} + Eh^{12} \quad (1)$$

Where, Z is the sag—the axis-component of the displacement of the surface from the aspheric vertex, when the surface is at height H from the optical axis; c is a paraxial curvature of the aspheric, c=1/R (that is, the paraxial curvature c is reciprocal of the radius of curvature R in the above Table 1); k is a conic coefficient; A, B, C, D, E are high-order coefficients. Table 2 below shows the conic coefficient k and the high-order coefficients A, B, C, D and E applicable to aspheric surfaces S1, S2, S7 and S8 in Example 1.

TABLE 2

| Surface No. | k | A | B | C | D | E |
|---|---|---|---|---|---|---|
| S1 | −1.2528 | −1.9487E−05 | −2.6375E−07 | −2.4481E−09 | −3.1091E−11 | −5.3115E−14 |
| S2 | 0.1072 | 1.2436E−05 | 1.3728E−07 | −4.3608E−09 | −1.3093E−10 | 8.872847−E13 |
| S7 | −1.7194 | −4.8597E−05 | −1.2513E−07 | −5.9151E−09 | 1.3829E−10 | −9.0245E−13 |
| S8 | 4.4790 | 4.5741E−07 | −6.9083E−08 | −1.5000E−09 | 8.2123E−11 | −5.6514E−13 |

Table 3 below shows a maximum effective aperture diameter D of the object-side surface S1 of the first lens L1 corresponding to a maximum field-of-view of the optical lens assembly, an image height H corresponding to the maximum field-of-view of the optical lens assembly, the maximum field-of-view FOV of the optical lens assembly, a total track length TTL of the optical lens assembly (i.e., a distance along the optical axis from a center of the objectside surface S1 of the first lens L1 to the imaging plane IMA) - and a total focal length F of the optical lens assembly in Example 1.

TABLE 3

| Parameters | D (mm) | H (mm) | FOV (°) | TTL (mm) | F (mm) |
|---|---|---|---|---|---|
| Value | 16.79 | 9.16 | 31.2 | 35.21 | 16.55 |

In this example, a radius of curvature R1 of the object-side surface S1 of the first lens L1, a radius of curvature R2 of the image-side surface S2 of the first lens L1 and the center thickness d1 of the first lens L1 along the optical axis satisfy R1/(R2+d1)=0.843. The maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.059. The total track length TTL of the optical lens assembly and the total focal length F of the optical lens assembly satisfy TTL/F=2.128.

Example 2

Figure 2:
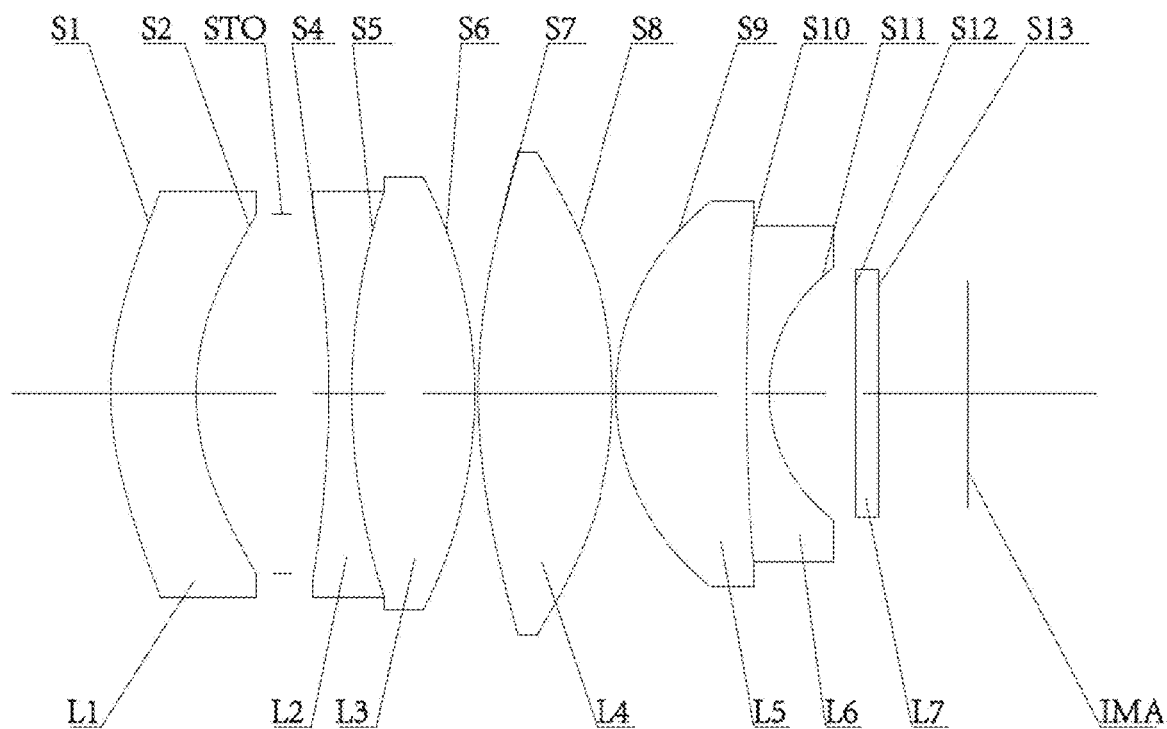
FIG. 2 is a schematic structural diagram showing an optical lens assembly according to Example 2 of the present disclosure.

An optical lens assembly according to Example 2 of the present disclosure is described below with reference to FIG. 2. In this example and the following examples, for the purpose of brevity, the description of parts similar to those in Example 1 will be omitted. FIG. 2 is a schematic structural view of the optical lens assembly according to Example 2 of the present disclosure.

As shown in FIG. 2, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having positive refractive power, and an object-side surface S1 thereof is a convex surface and an image-side surface S2 thereof is a concave surface. Both the object-side surface S1 and the image-side surface S2 of the first lens L1 are aspherical. The second lens L2 is a biconcave lens having negative refractive power, and both an object-side surface S4 and an image-side surface S5 thereof are concave surfaces. Both the object-side surface S4 and the image-side surface S5 of the second lens L2 are spherical. The third lens L3 is a biconvex lens having positive refractive power, and both an object-side surface S5 and an image-side surface S6 thereof are convex surfaces. Both the object-side surface S5 and the image-side surface S6 of the third lens L3 are spherical. The fourth lens L4 is a biconvex lens having positive refractive power, and both an object-side surface S7 and an image-side surface S8 thereof are convex surfaces. Both the object-side surface S7 and the image-side surface S8 of the fourth lens L4 are aspherical. The fifth lens L5 is a meniscus lens having positive refractive power, and an object-side surface S9 thereof is a convex surface and an image-side surface S10 thereof is a concave surface. Both the object-side surface S9 and the image-side surface S10 of the fifth lens L5 are spherical. The sixth lens L6 is a meniscus lens having negative refractive power, and an object-side surface S10 thereof is a convex surface and an image-side surface S11 thereof is a concave surface. Both the object-side surface S10 and the image-side surface S11 of the sixth lens L6 are spherical.

In this example, the second lens L2 and the third lens L3 are cemented together to form a first cemented lens. The fifth lens L5 and the sixth lens L6 are cemented together to form a second cemented lens.

Optionally, the optical lens assembly may further include an optical filter and/or a protective lens L7 having an object-side surface S12 and an image-side surface S13. The optical filter may be used to correct color deviations. The protective lens may be used to protect an image sensing chip located on an imaging plane IMA. Light from an object sequentially passes through the respective surfaces S1 to S13 and is finally imaged on the imaging plane IMA.

In the optical lens assembly of the present example, a stop STO may be disposed between the first lens L1 and the second lens L2 to improve imaging quality.

The present example employs six lenses as an example. By properly configuring the refractive power and surface shape of each lens, the center thickness of each lens, and the air gap between the lenses, one of the beneficial effects of miniaturization, large aperture, and high pixels may be achieved.

Table 4 shows radius of curvature R, thickness T, refractive index Nd and Abbe number Vd of each lens of the optical lens assembly in Example 2, wherein the units for the radius of curvature R and the thickness T are millimeter (mm).

TABLE 4

| Surface No. | Radius of Curvature R | Thickness T | Refractive Index Nd | Abbe Number Vd |
|---|---|---|---|---|
| S1 | 12.2860 | 3.5019 | 1.81 | 41.00 |
| S2 | 9.7264 | 3.4446 | | |
| STO | Infinite | 1.9422 | | |
| S4 | −42.4117 | 0.9500 | 1.72 | 25.30 |
| S5 | 25.3226 | 5.0210 | 1.62 | 55.00 |
| S6 | −18.4814 | 0.1500 | | |
| S7 | 24.5971 | 5.5007 | 1.59 | 61.20 |
| S8 | −15.7097 | 0.1500 | | |
| S9 | 9.4900 | 5.3176 | 1.50 | 72.00 |
| S10 | 74.0837 | 0.9500 | 1.63 | 40.00 |
| S11 | 6.1057 | 3.5000 | | |
| S12 | Infinite | 0.9500 | 1.52 | 64.17 |
| S13 | Infinite | 3.3590 | | |
| IMA | Infinite | | | |

Table 5 below shows the conic coefficient k and the high-order coefficients A, B, C, D and E applicable to aspheric surfaces S1, S2, S7 and S8 in Example 2, wherein the surface shape of each aspheric surface may be defined by the formula (1) given in the above Example 1.

TABLE 5

| Surface No. | k | A | B | C | D | E |
|---|---|---|---|---|---|---|
| S1 | −1.0289 | −3.3392E−05 | −1.1255E−06 | −8.2248E−09 | −6.1424E−11 | 6.6353−E13 |
| S2 | −0.5664 | −3.8888E−04 | −1.7530E−06 | −2.4985E−08 | 1.3835E−10 | 1.9454E−12 |
| S7 | −8.1736 | −3.3951E−05 | −8.0724E−08 | 1.3923E−09 | −1.5267E−11 | 4.2385E−14 |
| S8 | 0.0452 | 3.5933E−05 | 1.5786E−08 | 1.7594E−09 | −1.0932E−11 | 4.3212E−14 |

Table 6 below shows a maximum effective aperture diameter D of the object-side surface S1 of the first lens L1 corresponding to a maximum field-of-view of the optical lens assembly, an image height H corresponding to the maximum field-of-view of the optical lens assembly, the maximum field-of-view FOV of the optical lens assembly, a total track length TTL of the optical lens assembly and a total focal length F of the optical lens assembly in Example 2.

TABLE 6

| Parameters | D (mm) | H (mm) | FOV (°) | TTL (mm) | F (mm) |
|---|---|---|---|---|---|
| Value | 15.50 | 9.04 | 31.2 | 34.73 | 15.44 |

In this example, a radius of curvature R1 of the object-side surface S1 of the first lens L1, a radius of curvature R2 of the image-side surface S2 of the first lens L1 and the center thickness d1 of the first lens L1 along the optical axis satisfy R1/(R2+d1)=0.929. The maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.055. The total track length TTL of the optical lens assembly and the total focal length F of the optical lens assembly satisfy TTL/F=2.249.

Example 3

Figure 3:
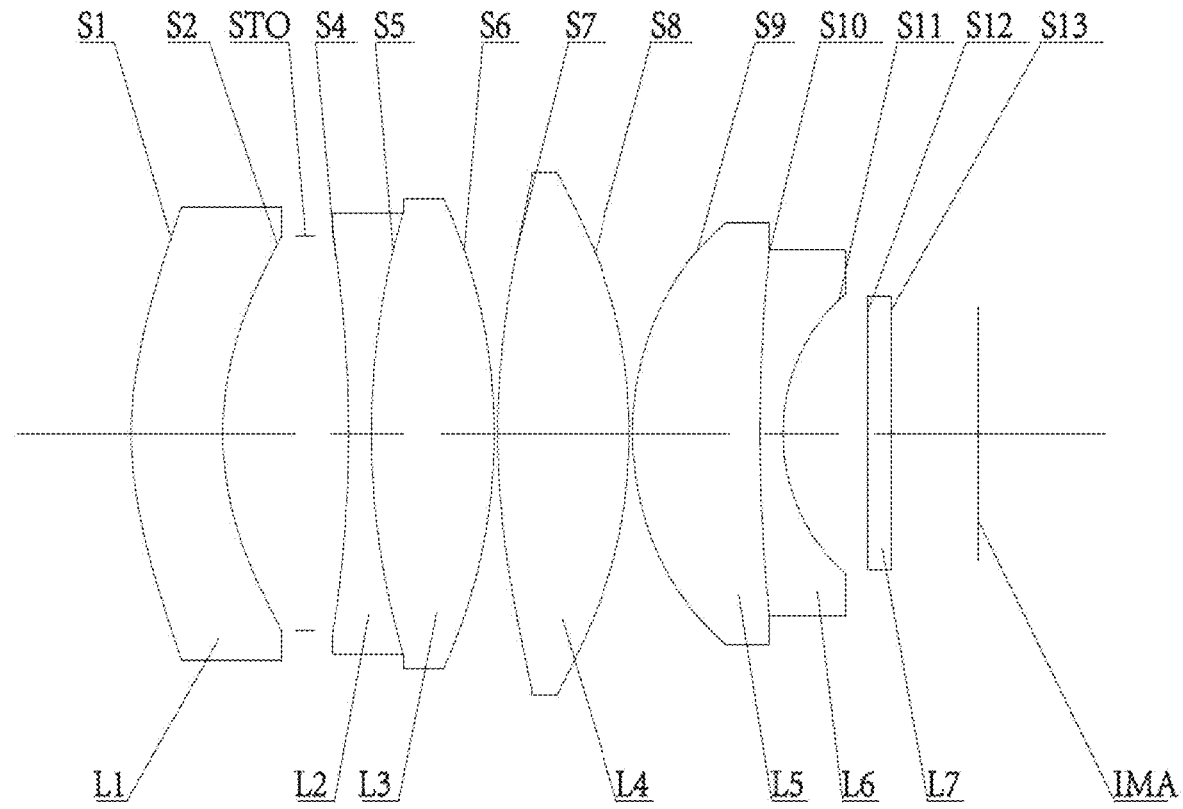
FIG. 3 is a schematic structural diagram showing an optical lens assembly according to Example 3 of the present disclosure.

An optical lens assembly according to Example 3 of the present disclosure is described below with reference to FIG. 3. FIG. 3 is a schematic structural view of the optical lens assembly according to Example 3 of the present disclosure.

As shown in FIG. 3, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having positive refractive power, and an object-side surface S1 thereof is a convex surface and an image-side surface S2 thereof is a concave surface. Both the object-side surface S1 and the image-side surface S2 of the first lens L1 are aspherical. The second lens L2 is a biconcave lens having negative refractive power, and both an object-side surface S4 and an image-side surface S5 thereof are concave surfaces. Both the object-side surface S4 and the image-side surface S5 of the second lens L2 are spherical. The third lens L3 is a biconvex lens having positive refractive power, and both an objectside surface S5 and an image-side surface S6 thereof are convex surfaces. Both the object-side surface S5 and the image-side surface S6 of the third lens L3 are spherical. The fourth lens L4 is a biconvex lens having positive refractive power, and both an object-side surface S7 and an image-side surface S8 thereof are convex surfaces. Both the object-side surface S7 and the image-side surface S8 of the fourth lens L4 are aspherical. The fifth lens L5 is a meniscus lens having positive refractive power, and an object-side surface S9 thereof is a convex surface and an image-side surface S10 thereof is a concave surface. Both the object-side surface S9 and the image-side surface S10 of the fifth lens L5 are spherical. The sixth lens L6 is a meniscus lens having negative refractive power, and an object-side surface S10 thereof is a convex surface and an image-side surface S11 thereof is a concave surface. Both the object-side surface S10 and the image-side surface S11 of the sixth lens L6 are spherical.

In this example, the second lens L2 and the third lens L3 are cemented together to form a first cemented lens. The fifth lens L5 and the sixth lens L6 are cemented together to form a second cemented lens.

Optionally, the optical lens assembly may further include an optical filter and/or a protective lens L7 having an object-side surface S12 and an image-side surface S13. The optical filter may be used to correct color deviations. The protective lens may be used to protect an image sensing chip located on an imaging plane IMA. Light from an object sequentially passes through the respective surfaces S1 to S13 and is finally imaged on the imaging plane IMA.

In the optical lens assembly of the present example, a stop STO may be disposed between the first lens L1 and the second lens L2 to improve imaging quality.

The present example employs six lenses as an example. By properly configuring the refractive power and surface shape of each lens, the center thickness of each lens, and the air gap between the lenses, one of the beneficial effects of miniaturization, large aperture, and high pixels may be achieved.

Table 7 shows radius of curvature R, thickness T, refractive index Nd and Abbe number Vd of each lens of the optical lens assembly in Example 3, wherein the units for the radius of curvature R and the thickness T are millimeter (mm).

TABLE 7

| Surface No. | Radius of Curvature R | Thickness T | Refractive Index Nd | Abbe Number Vd |
|---|---|---|---|---|
| S1 | 12.5436 | 3.7869 | 1.81 | 41.00 |
| S2 | 9.9300 | 3.4294 | | |
| STO | Infinite | 1.7586 | | |
| S4 | −39.7055 | 0.9500 | 1.85 | 23.00 |
| S5 | 24.4760 | 5.0672 | 1.62 | 57.00 |
| S6 | −17.9424 | 0.1500 | | |
| S7 | 25.3715 | 5.4673 | 1.59 | 55.00 |
| S8 | −15.5242 | 0.1500 | | |
| S9 | 9.3452 | 5.2608 | 1.50 | 61.00 |
| S10 | 55.3539 | 0.9500 | 1.63 | 35.70 |
| S11 | 6.0617 | 3.5000 | | |
| S12 | Infinite | 0.9500 | 1.52 | 64.17 |
| S13 | Infinite | 3.6102 | | |
| IMA | Infinite | | | |

Table 8 below shows the conic coefficient k and the high-order coefficients A, B, C, D and E applicable to aspheric surfaces S1, S2, S7 and S8 in Example 3, wherein the surface shape of each aspheric surface may be defined by the formula (1) given in the above Example 1.

TABLE 8

| Surface No. | k | A | B | C | D | E |
|---|---|---|---|---|---|---|
| S1 | −2.9421 | −2.7746E−05 | −9.5168E−07 | −6.1404E−09 | −8.5528E−11 | 6.4854E−13 |
| S2 | −3.3719 | −2.4279E−05 | −1.4894E−06 | −1.8092E−08 | −8.8118E−11 | 3.6200E−12 |
| S7 | −0.4170 | −8.6229E−05 | −8.9364E−08 | 1.6333E−09 | −1.6762E−11 | 4.3791E−14 |
| S8 | 0.0049 | 8.5305E−05 | 1.4644E−08 | 1.9477E−09 | −1.2161E−11 | 5.1340E−14 |

Table 9 below shows a maximum effective aperture diameter D of the object-side surface S1 of the first lens L1 corresponding to a maximum field-of-view of the optical lens assembly, an image height H corresponding to the maximum field-of-view of the optical lens assembly, the maximum field-of-view FOV of the optical lens assembly, a total track length TTL of the optical lens assembly and a total focal length F of the optical lens assembly in Example 3.

TABLE 9

| Parameters | D (mm) | H (mm) | FOV (°) | TTL (mm) | F (mm) |
|---|---|---|---|---|---|
| Value | 16.20 | 9.04 | 31.2 | 35.03 | 16.31 |

In this example, a radius of curvature R1 of the object-side surface S1 of the first lens L1, a radius of curvature R2 of the image-side surface S2 of the first lens L1 and the center thickness d1 of the first lens L1 along the optical axis satisfy R1/(R2+d1)=0.914. The maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.057. The total track length TTL of the optical lens assembly and the total focal length F of the optical lens assembly satisfy TTL/F=2.148.

Example 4

Figure 4:
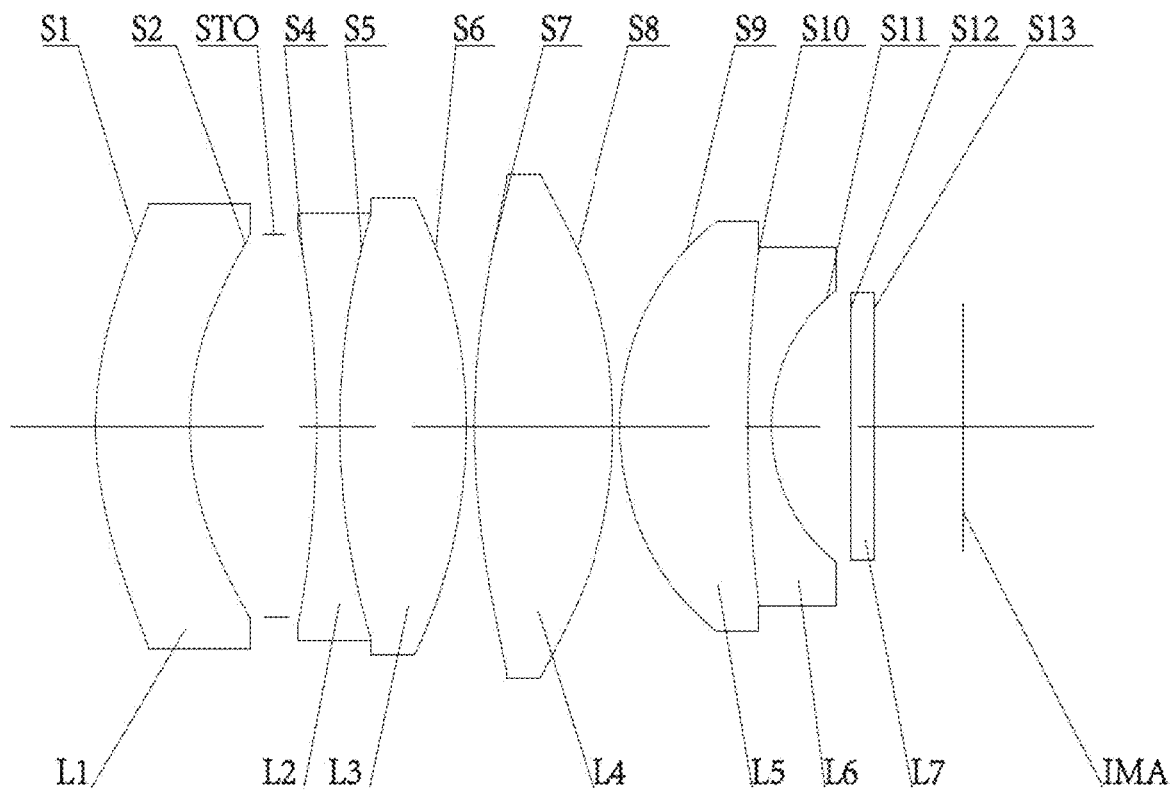
FIG. 4 is a schematic structural diagram showing an optical lens assembly according to Example 4 of the present disclosure.

An optical lens assembly according to Example 4 of the present disclosure is described below with reference to FIG. 4. FIG. 4 is a schematic structural view of the optical lens assembly according to Example 4 of the present disclosure.

As shown in FIG. 4, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having positive refractive power, and an object-side surface S1 thereof is a convex surface and an image-side surface S2 thereof is a concave surface. Both the object-side surface S1 and the image-side surface S2 of the first lens L1 are aspherical. The second lens L2 is a biconcave lens having negative refractive power, and both an object-side surface S4 and an image-side surface S5 thereof are concave surfaces. Both the object-side surface S4 and the image-side surface S5 of the second lens L2 are spherical. The third lens L3 is a biconvex lens having positive refractive power, and both an object-side surface S5 and an image-side surface S6 thereof are convex surfaces. Both the object-side surface S5 and the image-side surface S6 of the third lens L3 are spherical. The fourth lens L4 is a biconvex lens having positive refractive power, and both an object-side surface S7 and an image-side surface S8 thereof are convex surfaces. Both the object-side surface S7 and the image-side surface S8 of the fourth lens L4 are aspherical. The fifth lens L5 is a meniscus lens having positive refractive power, and an object-side surface S9 thereof is a convex surface and an image-side surface S10 thereof is a concave surface. Both the object-side surface S9 and the image-side surface S10 of the fifth lens L5 are spherical. The sixth lens L6 is a meniscus lens having negative refractive power, and an object-side surface S10 thereof is a convex surface and an image-side surface S11 thereof is a concave surface. Both the object-side surface S10 and the image-side surface S11 of the sixth lens L6 are spherical.

In this example, the second lens L2 and the third lens L3 are cemented together to form a first cemented lens. The fifth lens L5 and the sixth lens L6 are cemented together to form a second cemented lens.

Optionally, the optical lens assembly may further include an optical filter and/or a protective lens L7 having an object-side surface S12 and an image-side surface S13. The optical filter may be used to correct color deviations. The protective lens may be used to protect an image sensing chip located on an imaging plane IMA. Light from an object sequentially passes through the respective surfaces S1 to S13 and is finally imaged on the imaging plane IMA.

In the optical lens assembly of the present example, a stop STO may be disposed between the first lens L1 and the second lens L2 to improve imaging quality.

The present example employs six lenses as an example. By properly configuring the refractive power and surface shape of each lens, the center thickness of each lens, and the air gap between the lenses, one of the beneficial effects of miniaturization, large aperture, and high pixels may be achieved.

Table 10 shows radius of curvature R, thickness T, refractive index Nd and Abbe number Vd of each lens of the optical lens assembly in Example 4, wherein the units for the radius of curvature R and the thickness T are millimeter (mm).

TABLE 10

| Surface No. | Radius of Curvature R | Thickness T | Refractive Index Nd | Abbe Number Vd |
|---|---|---|---|---|
| S1 | 12.4843 | 3.8120 | 1.81 | 41.00 |
| S2 | 10.0405 | 3.3900 | | |
| STO | Infinite | 1.6980 | | |
| S4 | −36.0351 | 0.9500 | 1.85 | 28.30 |
| S5 | 24.7750 | 5.0900 | 1.62 | 55.50 |
| S6 | −17.7366 | 0.1500 | | |
| S7 | 25.8358 | 5.6200 | 1.59 | 61.20 |
| S8 | −15.3185 | 0.1500 | | |
| S9 | 9.1487 | 5.1600 | 1.50 | 64.00 |
| S10 | 47.8223 | 0.9500 | 1.63 | 30.70 |
| S11 | 6.0200 | 3.5000 | | |
| S12 | Infinite | 0.9500 | 1.52 | 64.17 |
| S13 | Infinite | 4.1000 | | |
| IMA | Infinite | | | |

Table 11 below shows the conic coefficient k and the high-order coefficients A, B, C, D and E applicable to aspheric surfaces S1, S2, S7 and S8 in Example 4, wherein the surface shape of each aspheric surface may be defined by the formula (1) given in the above Example 1.

TABLE 11

| Surface No. | k | A | B | C | D | E |
|---|---|---|---|---|---|---|
| S1 | −4.8739 | −4.3210E−05 | −9.0268E−07 | −3.8833E−09 | −1.1919E−10 | 7.5380E−13 |
| S2 | −1.3323 | −1.0460E−04 | −1.4299E−06 | −8.5481E−08 | −3.3189E−10 | 5.3462E−12 |
| S7 | −0.6865 | −5.8408E−05 | −1.0418E−07 | 1.9624E−09 | −1.9554E−11 | 5.3093E−14 |
| S8 | 1.4328 | 1.1649E−05 | −2.1344E−08 | 2.4572E−09 | −1.8437E−11 | 7.5619E−14 |

Table 12 below shows a maximum effective aperture diameter D of the object-side surface S1 of the first lens L1 corresponding to a maximum field-of-view of the optical lens assembly, an image height H corresponding to the maximum field-of-view of the optical lens assembly, the maximum field-of-view FOV of the optical lens assembly, a total track length TTL of the optical lens assembly and a total focal length F of the optical lens assembly in Example 4.

TABLE 12

| Parameters | D (mm) | H (mm) | FOV (°) | TTL (mm) | F (mm) |
|---|---|---|---|---|---|
| Value | 16.14 | 8.97 | 31.2 | 35.50 | 16.31 |

In this example, a radius of curvature R1 of the object-side surface S1 of the first lens L1, a radius of curvature R2 of the image-side surface S2 of the first lens L1 and the center thickness d1 of the first lens L1 along the optical axis satisfy R1/(R2+d1)=0.901. The maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.058. The total track length TTL of the optical lens assembly and the total focal length F of the optical lens assembly satisfy TTL/F=2.177.

Example 5

Figure 5:
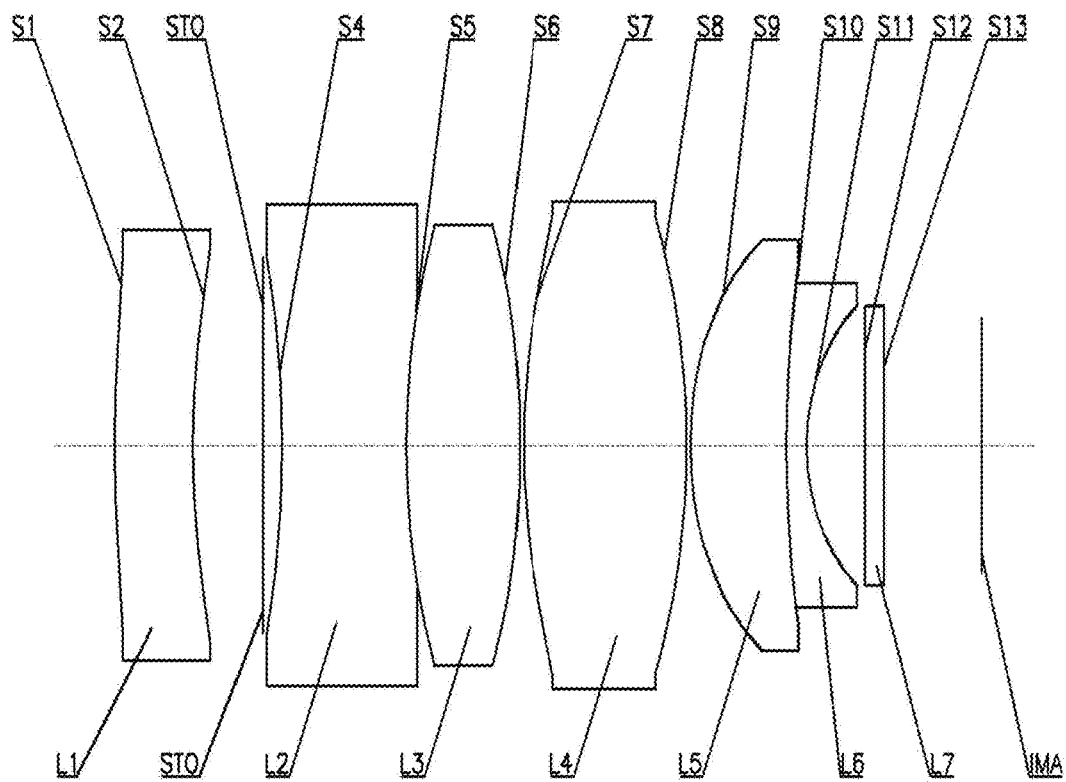
FIG. 5 is a schematic structural diagram showing an optical lens assembly according to Example 5 of the present disclosure.

An optical lens assembly according to Example 5 of the present disclosure is described below with reference to FIG. 5. FIG. 5 is a schematic structural view of the optical lens assembly according to Example 5 of the present disclosure.

As shown in FIG. 5, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having negative refractive power, and an object-side surface S1 thereof is a convex surface and an image-side surface S2 thereof is a concave surface. The second lens L2 is a biconcave lens having negative refractive power, and both an object-side surface S4 and an image-side surface S5 thereof are concave surfaces. The third lens L3 is a biconvex lens having positive refractive power, and both an object-side surface S5 and an image-side surface S6 thereof are convex surfaces. The second lens L2 and the third lens L3 are cemented together to form a first cemented lens. The fourth lens L4 is a biconvex lens having positive refractive power, and both an object-side surface S7 and an image-side surface S8 thereof are convex surfaces. The fifth lens L5 is a meniscus lens having positive refractive power, and an object-side surface S9 thereof is a convex surface and an image-side surface S10 thereof is a concave surface. The sixth lens L6 is a meniscus lens having negative refractive power, and an object-side surface S10 thereof is a convex surface and an image-side surface S11 thereof is a concave surface. The fifth lens L5 and the sixth lens L6 are cemented together to form a second cemented lens.

The first lens L1 and the fourth lens L4 are both aspherical lenses, and their respective object-side surface and image-side surface are both aspherical.

Optionally, the optical lens assembly may further include an optical filter L7 and/or a protective lens L7' having an object-side surface S12 and an image-side surface S13. The optical filter L7 may be used to correct color deviations. The protective lens L7' may be used to protect an image sensing chip located on an imaging plane IMA. Light from an object sequentially passes through the respective surfaces S1 to S13 and is finally imaged on the imaging plane IMA.

In the optical lens assembly of the present example, a stop STO may be disposed between the first lens L1 and the second lens L2 to improve imaging quality.

Table 13 shows radius of curvature R, thickness T, refractive index Nd and Abbe number Vd of each lens of the optical lens assembly in Example 5, wherein the units for the radius of curvature R and the thickness T are millimeter (mm).

TABLE 13

| Surface No. | Radius of Curvature R | Thickness T | Refractive Index Nd | Abbe Number Vd |
|---|---|---|---|---|
| S1 | 38.9373 | 4.0043 | 1.66 | 55.15 |
| S2 | 26.3933 | 3.5457 | | |
| STO | Infinite | 1.0000 | | |
| S4 | −34.3400 | 6.3057 | 1.63 | 35.02 |
| S5 | 24.9839 | 5.9481 | 1.64 | 61.67 |
| S6 | −24.9839 | 0.1000 | | |
| S7 | 22.0182 | 8.3801 | 1.53 | 60.71 |
| S8 | −24.5845 | 0.1000 | | |
| S9 | 10.2581 | 5.0007 | 1.72 | 50.59 |
| S10 | 39.2369 | 1.0000 | 1.79 | 24.59 |
| S11 | 6.9667 | 3.0000 | | |
| S12 | Infinite | 0.9500 | 1.52 | 64.21 |
| S13 | Infinite | 5.0019 | | |
| IMA | Infinite | | | |

The present example employs six lenses as an example. By properly configuring the refractive power and surface shape of each lens, the center thickness of each lens, the lens assembly may have at least one of the beneficial effects of miniaturization, small aperture, high resolution, low cost, large aperture, back focal length, etc.

Table 14 below shows the conic coefficient k and the high-order coefficients A, B, C, D and E applicable to aspheric surfaces S1, S2, S7 and S8 in Example 5, wherein the surface shape of each aspheric surface may be defined by the formula (1) given in the above Example 1.

TABLE 14

| Surface No. | K | A | B | C | D | E |
|---|---|---|---|---|---|---|
| S1 | −4.7283 | −7.9324E−05 | −2.2682E−07 | 1.3575E−09 | −2.8901E−11 | 1.8624E−13 |
| S2 | 1.1454 | −8.6828E−05 | −7.5943E−08 | 5.6449E−09 | −8.4400E−11 | 6.5528E−13 |
| S7 | −1.3587 | −2.7444E−05 | −7.4029E−08 | −9.5866E−10 | 9.3217E−12 | −6.9403E−14 |
| S8 | 0.5546 | 1.8019E−05 | −1.1792E−07 | 2.4916E−10 | −1.7044E−12 | −2.1114E−14 |

Table 15 below shows a total focal length F of the optical lens assembly, a total track length TTL of the optical lens assembly (i.e., a distance along the optical axis from a center of the object-side surface S1 of the first lens L1 to the imaging plane IMA), a maximum effective aperture diameter D of the object-side surface S1 of the first lens L1 corresponding to a maximum field-of-view of the optical lens assembly, an image height H corresponding to the maximum field-of-view of the optical lens assembly, the maximum field-of-view FOV of the optical lens assembly, a combined focal length F23 of the second lens L2 and the third lens L3 (i.e., a focal length of the first cemented lens), a focal length F2 of the second lens L2, a focal length F3 of the third lens L3, an optical back focal length BFL of the optical lens assembly (i.e., a distance along the optical axis from a center of the image-side surface S11 of the sixth lens L6, the last lens, to the imaging plane IMA), and a lens group length TL of the optical lens assembly (i.e., a distance along the optical axis from the center of the object-side surface S1 of the first lens L1 to the center of the image-side surface S11 of the sixth lens L6) in Example 5.

TABLE 15

| F (mm) | 16.06 | F2 (mm) | −21.89 |
|---|---|---|---|
| TTL (mm) | 44.34 | F3 (mm) | 20.33 |
| D (mm) | 16.60 | BFL (mm) | 8.95 |
| H (mm) | 8.80 | TL (mm) | 38.38 |
| FOV (°) | 32.00 | | |
| F23 (mm) | 88.70 | | |

In this example, the optical back focal length BFL of the optical lens assembly and the lens group length TL of the optical lens assembly satisfy BFL/TL=0.2332. The focal length F3 of the third lens L3 and the focal length F2 of the second lens L2 satisfy |F3/F2|=0.9287. The total track length TTL of the optical lens assembly and the total focal length F of the optical lens assembly satisfy TTL/F=2.7609. The maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.0590. The combined focal length F23 of the second lens L2 and the third lens L3 and the total focal length F of the optical lens assembly satisfy F23/F=5.5230.

Example 6

Figure 6:
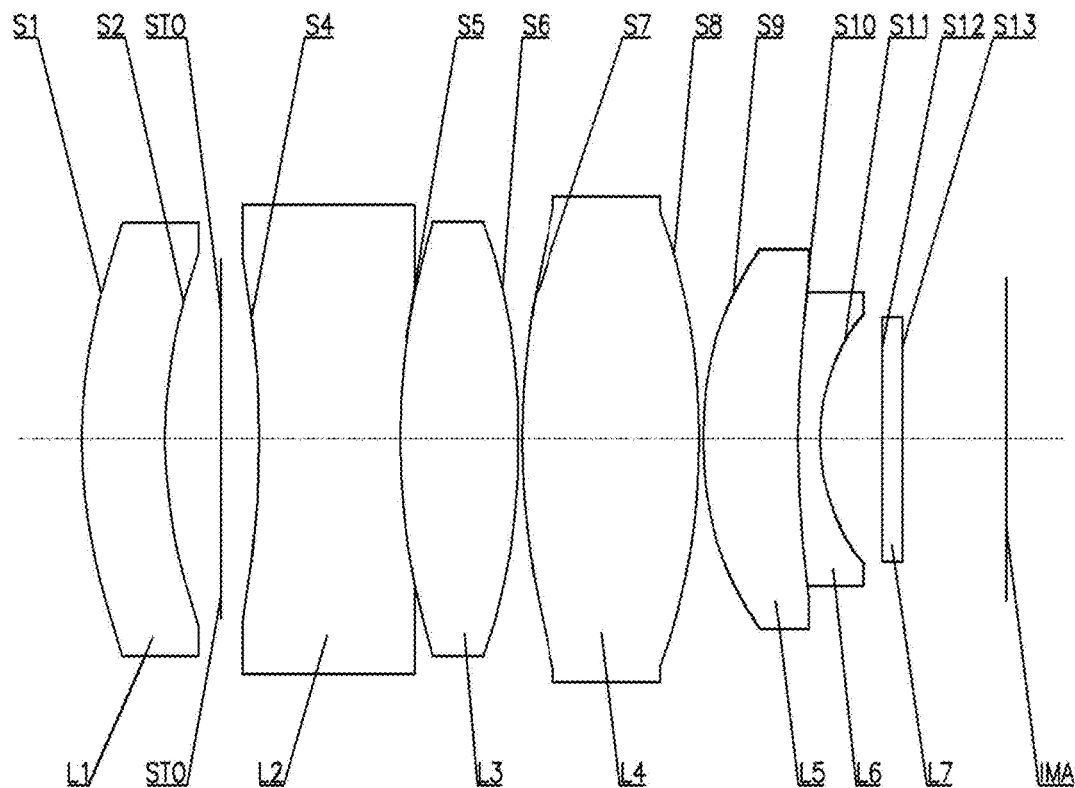
FIG. 6 is a schematic structural diagram showing an optical lens assembly according to Example 6 of the present disclosure.

An optical lens assembly according to Example 6 of the present disclosure is described below with reference to FIG. 6. FIG. 6 is a schematic structural view of the optical lens assembly according to Example 6 of the present disclosure.

As shown in FIG. 6, the optical lens assembly includes a first lens L1, a second lens L2, a third lens L3, a fourth lens L4, a fifth lens L5 and a sixth lens L6, which are sequentially arranged along an optical axis from an object side to an imaging side of the optical lens assembly.

The first lens L1 is a meniscus lens having negative refractive power, and an object-side surface S1 thereof is a convex surface and an image-side surface S2 thereof is a concave surface. The second lens L2 is a biconcave lens having negative refractive power, and both an object-side surface S4 and an image-side surface S5 thereof are concave surfaces. The third lens L3 is a biconvex lens having positive refractive power, and both an object-side surface S5 and an image-side surface S6 thereof are convex surfaces. The second lens L2 and the third lens L3 are cemented together to form a first cemented lens. The fourth lens L4 is a biconvex lens having positive refractive power, and both an object-side surface S7 and an image-side surface S8 thereof are convex surfaces. The fifth lens L5 is a meniscus lens having positive refractive power, and an object-side surface S9 thereof is a convex surface and an image-side surface S10 thereof is a concave surface. The sixth lens L6 is a meniscus lens having negative refractive power, and an object-side surface S10 thereof is a convex surface and an image-side surface S11 thereof is a concave surface. The fifth lens L5 and the sixth lens L6 are cemented together to form a second cemented lens.

The first lens L1 and the fourth lens L4 are both aspherical lenses, and their respective object-side surface and image-side surface are both aspherical.

Optionally, the optical lens assembly may further include an optical filter L7 and/or a protective lens L7' having an object-side surface S12 and an image-side surface S13. The optical filter L7 may be used to correct color deviations. The protective lens L7' may be used to protect an image sensing chip located on an imaging plane IMA. Light from an object sequentially passes through the respective surfaces S1 to S13 and is finally imaged on the imaging plane IMA.

In the optical lens assembly of the present example, a stop STO may be disposed between the first lens L1 and the second lens L2 to improve imaging quality.

The present example employs six lenses as an example. By properly configuring the refractive power and surface shape of each lens, the center thickness of each lens, the lens assembly may have at least one of the beneficial effects of miniaturization, small aperture, high resolution, low cost, large aperture, back focal length, etc.

Table 16 shows radius of curvature R, thickness T, refractive index Nd and Abbe number Vd of each lens of the optical lens assembly in Example 6, wherein the units for the radius of curvature R and the thickness T are millimeter (mm). Table 17 below shows the conic coefficient k and the high-order coefficients A, B, C, D and E applicable to aspheric surfaces S1, S2, S7 and S8 in Example 6, wherein the surface shape of each aspheric surface may be defined by the formula (1) given in the above Example 1. Table 18 below shows a total focal length F of the optical lens assembly, a total track length TTL of the optical lens assembly, a maximum effective aperture diameter D of the object-side surface S1 of the first lens L1 corresponding to a maximum field-of-view of the optical lens assembly, an image height H corresponding to the maximum field-of-view of the optical lens assembly, the maximum field-of-view FOV of the optical lens assembly, a combined focal length F23 of the second lens L2 and the third lens L3, a focal length F2 of the second lens L2, a focal length F3 of the third lens L3, an optical back focal length BFL of the optical lens assembly, and a lens group length TL of the optical lens assembly in Example 6.

TABLE 16

| Surface No. | Radius of Curvature R | Thickness T | Refractive Index Nd | Abbe Number Vd |
|---|---|---|---|---|
| S1 | 16.0000 | 4.0000 | 1.60 | 50.32 |
| S2 | 15.3424 | 2.7000 | | |
| STO | Infinite | 1.8000 | | |
| S4 | −32.3424 | 6.7149 | 1.64 | 33.54 |
| S5 | 23.3424 | 5.7961 | 1.60 | 66.45 |
| S6 | −21.0256 | 0.1000 | | |
| S7 | 24.0000 | 8.4947 | 1.59 | 61.16 |
| S8 | −22.0000 | 0.1002 | | |
| S9 | 11.0324 | 4.6441 | 1.66 | 56.35 |
| S10 | 37.0000 | 1.0000 | 1.73 | 27.03 |
| S11 | 6.7000 | 3.0000 | | |
| S12 | Infinite | 0.9500 | 1.52 | 64.21 |
| S13 | Infinite | 5.0013 | | |
| IMA | Infinite | | | |

TABLE 17

| Surface No. | K | A | B | C | D | E |
|---|---|---|---|---|---|---|
| S1 | −0.3014 | −4.2310E−05 | −3.4466E−07 | −1.4862E−09 | −2.4181E−11 | 2.6748E−13 |
| S2 | 1.2609 | −7.5900E−05 | −7.0746E−07 | −6.8779E−09 | −2.1829E−11 | −6.0048E−13 |
| S7 | −1.6181 | −1.9665E−05 | −7.3386E−08 | −1.5727E−09 | 3.7507E−11 | −1.9899E−13 |
| S8 | 0.6513 | 1.1418E−05 | −9.8801E−08 | 1.0749E−10 | −8.0087E−13 | −4.4503E−14 |

TABLE 18

| F (mm) | 17.07 | F2 (mm) | −19.99 |
|---|---|---|---|
| TTL (mm) | 44.30 | F3 (mm) | 19.45 |
| D (mm) | 16.80 | BFL (mm) | 8.95 |
| H (mm) | 9.82 | TL (mm) | 38.35 |
| FOV (°) | 31.20 | | |
| F23 (mm) | 93.07 | | |

In this example, the optical back focal length BFL of the optical lens assembly and the lens group length TL of the optical lens assembly satisfy BFL/TL=0.2334. The focal length F3 of the third lens L3 and the focal length F2 of the second lens L2 satisfy |F3/F2|=0.9730. The total track length TTL of the optical lens assembly and the total focal length F of the optical lens assembly satisfy TTL/F=2.5952. The maximum field-of-view FOV of the optical lens assembly, the maximum effective aperture diameter D of the object-side surface S1 of the first lens L1 corresponding to the maximum field-of-view of the optical lens assembly, and the image height H corresponding to the maximum field-of-view of the optical lens assembly satisfy D/H/FOV=0.0548. The combined focal length F23 of the second lens L2 and the third lens L3 and the total focal length F of the optical lens assembly satisfy F23/F=5.4523.

In view of the above, Examples 1 to 6 respectively satisfy the relationship shown in Table 19 below.

TABLE 19

| Conditional\Example | 1 | 2 | 3 | 4 | 5 | 6 |
|---|---|---|---|---|---|---|
| R1/(R2 + d1) | 0.843 | 0.929 | 0.914 | 0.901 | 1.281 | 0.827 |
| D/H/FOV | 0.059 | 0.055 | 0.057 | 0.058 | 0.059 | 0.055 |
| TTL/F | 2.128 | 2.249 | 2.148 | 2.177 | 2.761 | 2.595 |
| BFL/TL | 0.291 | 0.290 | 0.299 | 0.317 | 0.233 | 0.233 |
| |F3/F2| | 0.966 | 0.830 | 0.978 | 1.026 | 0.929 | 0.973 |
| F23/F | 5.734 | 4.388 | 8.858 | 10.853 | 5.523 | 5.452 |
| F2 | −17.6783 | −21.7036 | −17.5269 | −17.0162 | | |
| F3 | 17.0843 | 18.0115 | 17.1361 | 17.4617 | | |
| F23 | 94.8904 | 67.7482 | 144.4820 | 177.0050 | | |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising:
a first lens, a second lens, a third lens, a fourth lens, a fifth lens and a sixth lens, which are arranged sequentially from an object side to an image side along an optical axis,
wherein,
a total number of lenses comprised in the optical lens assembly is six;
an object-side surface of the first lens is a convex surface, and an image-side surface of the first lens is a concave surface;
the second lens has negative refractive power;
the third lens has positive refractive power;
the fourth lens has positive refractive power, and each of an object-side surface and an image-side surface of the fourth lens is convex surface;
the fifth lens has positive refractive power; and
the sixth lens has negative refractive power,
wherein TTL/F≤3.5,
where TTL is a total track length of the optical lens assembly, and F is a total focal length of the optical lens assembly.

2. The optical lens assembly according to claim 1, wherein each of an object-side surface and an image-side surface of the second lens is concave surface,
wherein each of an object-side surface and an image-side surface of the third lens is convex surface, and
wherein the second lens and the third lens are cemented to form a cemented lens.

3. The optical lens assembly according to claim 1, wherein an object-side surface of the fifth lens is a convex surface, and an image-side surface of the fifth lens is a concave surface,
wherein an object-side surface of the sixth lens is a convex surface, and an image-side surface of the sixth lens is a concave surface, and
wherein the fifth lens and the sixth lens are cemented to form a cemented lens.

4. The optical lens assembly according to claim 1, wherein at least one of the first lens and the fourth lens is aspherical lens.

5. The optical lens assembly according to claim 1, wherein 0.6≤R1/(R2+d1)≤1.1,
where R1 is a radius of curvature of the object-side surface of the first lens,
R2 is a radius of curvature of the image-side surface of the first lens, and
d1 is a center thickness of the first lens along the optical axis.

6. The optical lens assembly according to claim 1, wherein D/H/FOV≤0.08,
where FOV is a maximum field-of-view of the optical lens assembly,
D is a maximum effective aperture diameter of the object-side surface of the first lens corresponding to the maximum field-of-view of the optical lens assembly, and H is an image height corresponding to the maximum field-of-view of the optical lens assembly.

7. The optical lens assembly according to claim 1, wherein BFL/TL≥0.20,
where BFL is an optical back focal length of the optical lens assembly, and
TL is a distance along the optical axis from a center of the object-side surface of the first lens to a center of an image-side surface of the sixth lens.

8. The optical lens assembly according to claim 1, wherein |F3/F2|≤1.25,
where F3 is a focal length of the third lens, and
F2 is a focal length of the second lens.

9. The optical lens assembly according to claim 1, wherein 4≤F23/F≤7,
where F23 is a combined focal length of the second lens and the third lens, and
F is a total focal length of the optical lens assembly.

10. An optical lens assembly, comprising:
a first lens, a second lens, a third lens, a fourth lens, a fifth lens and a sixth lens, which are arranged sequentially from an object side to an image side along an optical axis,
wherein,
a total number of lenses comprised in the optical lens assembly is six;
the second lens has negative refractive power;
the third lens has positive refractive power;
the fourth lens has positive refractive power;
the fifth lens has positive refractive power; and
the sixth lens has negative refractive power,
wherein D/H/FOV≤0.08,
where FOV is a maximum field-of-view of the optical lens assembly,
D is a maximum effective aperture diameter of an object-side surface of the first lens corresponding to the maximum field-of-view of the optical lens assembly, and
H is an image height corresponding to the maximum field-of-view of the optical lens assembly, and
wherein TTL/F≤3.5,
where TTL is a total track length of the optical lens assembly, and F is a total focal length of the optical lens assembly.

11. The optical lens assembly according to claim 10, wherein the first lens has positive refractive power or negative refractive power, the object-side surface of the first lens is a convex surface, and an image-side surface of the first lens is a concave surface.

12. The optical lens assembly according to claim 10, wherein each of an object-side surface and an image-side surface of the second lens is concave surface,
wherein each of an object-side surface and an image-side surface of the third lens is convex surface, and
wherein the second lens and the third lens are cemented to form a cemented lens.

13. The optical lens assembly according to claim 10, wherein an object-side surface of the fifth lens is a convex surface, and an image-side surface of the fifth lens is a concave surface,
wherein an object-side surface of the sixth lens is a convex surface, and an image-side surface of the sixth lens is a concave surface, and
wherein the fifth lens and the sixth lens are cemented to form a cemented lens.

14. The optical lens assembly according to claim 10, wherein each of an object-side surface and an image-side surface of the fourth lens is convex surface.

15. The optical lens assembly according to claim 10, wherein 0.6≤R1/(R2+d1)≤1.1,
where R1 is a radius of curvature of the object-side surface of the first lens,
R2 is a radius of curvature of an image-side surface of the first lens, and
d1 is a center thickness of the first lens along the optical axis.

16. The optical lens assembly according to claim 10, wherein BFL/TL≥0.20,
where BFL is an optical back focal length of the optical lens assembly, and
TL is a distance along the optical axis from a center of the object-side surface of the first lens to a center of an image-side surface of the sixth lens.

17. The optical lens assembly according to claim 10, wherein |F3/F2|≤1.25,
where F3 is a focal length of the third lens, and
F2 is a focal length of the second lens.

18. The optical lens assembly according to claim 10, wherein 4≤F23/F≤7,
where F23 is a combined focal length of the second lens and the third lens, and
F is a total focal length of the optical lens assembly.

19. The optical lens assembly according to claim 1, wherein the optical lens assembly satisfies one of:
TTL/F≤2.7609;
2.128≤TTL/F≤3.5;
0.2≤BFL/TL≤0.2334, where BFL is an optical back focal length of the optical lens assembly, and TL is a distance along the optical axis from a center of the object-side surface of the first lens to a center of an image-side surface of the sixth lens; or
0.9287≤|F3/F2|≤1.25, where F3 is a focal length of the third lens, and F2 is a focal length of the second lens.

20. The optical lens assembly according to claim 10, wherein the optical lens assembly satisfies one of:
TTL/F≤2.7609;
2.128≤TTL/F≤3.5;
0.2≤BFL/TL≤0.2334, where BFL is an optical back focal length of the optical lens assembly, and TL is a distance along the optical axis from a center of the object-side surface of the first lens to a center of an image-side surface of the sixth lens; or
0.9287≤|F3/F2|≤1.25, where F3 is a focal length of the third lens, and F2 is a focal length of the second lens.

* * * * *